(12) United States Patent
Swanburg et al.

(10) Patent No.: US 8,155,696 B2
(45) Date of Patent: Apr. 10, 2012

(54) DEVICES, SYSTEMS AND METHODS FOR SCENARIO BASED SERVICES AND INTELLIGENT USER FEEDBACK

(75) Inventors: Scott Allen Swanburg, Duluth, GA (US); Mark Wuthnow, Austin, TX (US); Roger Mahler, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1126 days.

(21) Appl. No.: 11/545,600

(22) Filed: Oct. 11, 2006

(65) Prior Publication Data

US 2007/0129108 A1    Jun. 7, 2007

Related U.S. Application Data

(60) Provisional application No. 60/741,444, filed on Dec. 2, 2005.

(51) Int. Cl.
*H04M 1/00* (2006.01)
(52) U.S. Cl. .......... 455/556.1; 455/405; 455/414.1; 455/418; 709/218; 709/219
(58) Field of Classification Search ........ 455/556.1, 455/3.06, 405, 406, 412.1, 414.1, 418, 419, 455/466; 370/252; 709/203, 227, 218, 219; 713/1; 725/62, 140
See application file for complete search history.

(56) References Cited

U.S. PATENT DOCUMENTS

| | | | |
|---|---|---|---|
| 5,905,958 A * | 5/1999 | Houde | 455/437 |
| 2003/0101246 A1 | 5/2003 | Lahti | |
| 2004/0102182 A1 | 5/2004 | Reith | |
| 2005/0037746 A1 | 2/2005 | Ramalho et al. | |
| 2005/0069102 A1* | 3/2005 | Chang | 379/88.18 |
| 2006/0003740 A1* | 1/2006 | Munje | 455/412.1 |
| 2006/0121924 A1 | 6/2006 | Rengaraju et al. | |
| 2006/0155814 A1* | 7/2006 | Bennett et al. | 709/207 |
| 2006/0286984 A1 | 12/2006 | Bonner | 455/445 |
| 2007/0016433 A1* | 1/2007 | Leakey et al. | 705/1 |
| 2007/0093264 A1* | 4/2007 | Srinivasan et al. | 455/556.1 |
| 2007/0156696 A1* | 7/2007 | Lim | 707/9 |
| 2008/0167016 A1* | 7/2008 | Swanburg et al. | 455/414.1 |
| 2008/0293375 A1* | 11/2008 | Swanburg | 455/405 |

FOREIGN PATENT DOCUMENTS

WO    02082814 A2    10/2002

OTHER PUBLICATIONS

International Preliminary Report on Patentability, The International Bureau of WIPO, Report issued Apr. 15, 2009.

* cited by examiner

*Primary Examiner* — Shaima Q Aminzay
(74) *Attorney, Agent, or Firm* — Moazzam & Associates, LLC

(57) ABSTRACT

Devices, systems and methods are provided to communicate using mobile or wireless devices having a plurality of interactive applications, wherein each application is useable interactively with other applications. Thus, a user is enabled to utilize multiple applications interactively on a single mobile device, with each application providing intelligent feedback to an application server as to the use habits of the user with regard to that application. Further, the applications server provides a level of intelligence back to each mobile device creating an ongoing intelligent feedback loop.

14 Claims, 4 Drawing Sheets

DEVICES, SYSTEMS AND METHODS FOR SCENARIO BASED SERVICES AND INTELLIGENT USER FEEDBACK

This U.S. Utility patent application claims priority to U.S. Provisional Patent Application Ser. No. 60/741,444, filed Dec. 2, 2005, the content of which is hereby incorporated by reference in its entirety into this disclosure.

BACKGROUND OF THE INVENTION

1. Field of the Invention

The present invention relates to mobile/wireless/wireline communication services. More particularly, the present invention relates to mobile/wireless/wireline communication services that provide scenario based services.

2. Background of the Invention

Conventional mobile/wireless/wireline networks are generally limited in their ability to create service models for data applications. Taking the example of a mobile system, for the most part, limitations in current systems come from little intelligence in the network, little intelligence at the mobile end point devices and lack of collaboration of intelligence between the two. With the advent of mobile data networks that take advantage of Internet Protocol (IP) and the associated packet definitions for transmission, and a continuing increase in processor power in the mobile device, a need for new models exists.

Applications which are available on a mobile network are useable only in limited form. That is to say, one application can be launched and utilized, but such application is only available as a stand alone feature and cannot communicate with other applications simultaneously. Further, these applications provide little intelligence to the network operator because the data stream that they produce also has limited intelligence. For example, an IP stream can be opened today with data applications running that produce billing records but provide no immediate feedback to the subscriber. Thus, the applications available today operate statically, without the ability to configure, change or interact according to the needs of a user. The user must essentially utilize each application independently and only as each has been intended, without the flexibility of combining or altering the functionalities of multiple applications.

Thus, because of these and other limitations in the existing mobile, wireless and wireline world, a need exists in the art for a novel, powerful, versatile and efficient system to allow multiple applications to function simultaneously on the same device as well as allow intelligent communications between existing applications on the same device, between the device and servers, and between multiple devices.

SUMMARY OF THE INVENTION

The present invention provides and shows, through use of exemplary embodiments and scenarios, a novel and unique approach to communications over mobile/wireless networks which allows intelligent communication between applications, between mobile/wireless/wireline devices, and between a mobile/wireless/wireline device and remote servers. Several elements are included which allow for the operation of such a new system, including Network Intelligence (NI) and Device Intelligence (DI). The present invention includes functional abilities that contribute to an overall intelligent system beyond any that is in operation today. The resulting enhanced user experience is one of the many advantageous end results of the use of the present invention, with sub elements at both the network and the device levels. Such ability allows the use of multiple applications to operate simultaneously and interactively such that the user has greater flexibility in the use of the applications and is afforded the ability to create customized profiles as a result.

The present invention makes use of a combination of standards such as Internet Protocol (IP), IP Multimedia Subsystems (IMS), Java client architecture, and a newly defined User Interface and User Experience technique being termed herein and throughout this disclosure as Scenario Based Services (SBS) and Unique User Experience (UUE), respectively. As used herein and throughout this application, "UUE" is defined as a differentiating user experience that allows a user to have full control of multiple sophisticated applications using common language and techniques to use and interact with these multiple applications. In essence, this uncommon power given to a common user will empower the user with what is being defined here as "Unique" User Experience. These new terms, as defined within the scope of the present invention, will be described in detail and with examples below.

In one exemplary embodiment, the present invention provides an intelligent collection of attributes in individual software/service applications in mobile networks utilizing IMS network core elements and IMS/SIP enabled mobile communications devices.

In another exemplary embodiment, the present invention is a multi-tasking application environment for mobile communications devices utilizing a unique Object Orientated Core Services/Device Manager.

In yet another exemplary embodiment, the present invention is a user profiling of applications and events on a per subscriber basis allowing intelligent content push back to a Core Services/Device Manager on mobile communications devices.

In another exemplary embodiment, the present invention is a Unique User Experience (look and feel) based on the ability to launch multiple applications simultaneously and provide intelligent feedback to mobile communications devices for differing levels/thresholds of service.

DETAILED DESCRIPTION OF THE INVENTION

The present invention provides a more robust, more intelligent and more versatile system for cellular, wireless devices, Wi-Fi and wireline networks than is conventionally available. Through the use of the present invention, a user may operate multiple applications, present on the cellular/wireless/wireline device, simultaneously and interactively, regardless of what device is used or what network delivers it. Such ability has not been possible in conventional devices because of the conventional configurations that such devices are made available. Furthermore, the interactivity of applications, as shown and presented in the present disclosure, is unavailable to the level and capability presented herein. The examples presented and discussed below and shown in the exemplary embodiments are made with respect to exemplary cellular/wireless devices, systems and platforms as mere example, but the present invention is not limited to cellular/wireless devices. For example, one having ordinary skill in the art would be able to apply the teachings and disclosure presented herein to wireline devices, systems, platforms and methods using same.

To better understand the present invention and its capabilities and endless potential, it's useful to better understand the use of the term, "SBS," as used herein and throughout this disclosure.

In one of its many exemplary, useful and novel forms, SBS results in a user experience in which a suite of applications is made available for use during differing scenarios and contexts. The intelligent push and pull of applications foster communications across specific communities of interest. The user interface allows for a user defined customizable "desktop" accessing ability for using multiple applications simultaneously. The presentation of such universal information may be based on community or individual preferences.

There are many operator advantages for using SBS over conventional systems. The present system can provide a menu of applications for communities of interest, lower cost of implementation through $3^{rd}$ party software developers, provide higher subscriber retention through a differentiated service, add value through better response to customer needs, and improve granularity for service definitions through customer interaction, among others. Intelligence provided by SIP signaling may be used for interaction between applications at the Application Services layer.

Figure 1:
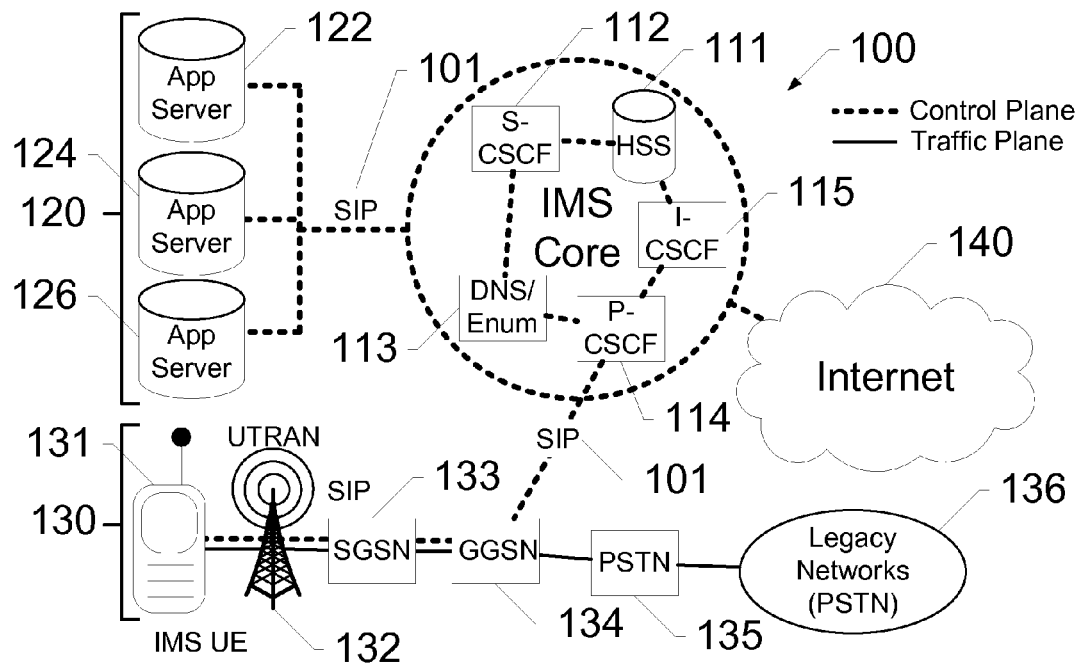
FIG. 1 shows an IMS network structure according to an exemplary embodiment of the present invention.

In considering the advantages of the present system over conventional systems, consider first an exemplary IMS network architecture 100, as shown in FIG. 1. The architecture 100 contains several general elements, including an IMS core 110, a dynamic event server subsystem (DESS) 120, a system for connecting to wireless terminals 130 and the Internet 140. The DESS 120 includes one or more application servers 122, 124 and 126. All such application servers 122, 124 and 126 are in communication with IMS Core 110 using a communication path, for example, SIP.

The IMS core 110 is shown with exemplary components individually known by one having ordinary skill in the art. For example, a home subscriber server (HSS) 111 is in communication with a serving-call server control function (S-CSCF) 112, which in turn is in communication with a domain name system/electronic numbering (DNS/ENUM) 113 to a proxy-call sever control function (P-CSCF) 114 to an interrogating-call server control function (I-CSCF) 115 back to the HSS 111. Other scenarios may also be possible and are within the purview of the present invention.

The wireless terminal architecture 130 includes a number of components individually known to one having ordinary skill in the art. For example, a gateway GRPS support node (GGSN) 134 is in communication with the P-CSCF 114 to pass the SIP signal from the IMS core 110 to the wireless terminal architecture 130. The GGSN 134 connects to legacy networks (such as the public switched telephone network, PSTN) 136 through a PSTN gateway 135. Also connected to the GGSN 134 is a serving GPRS support node (SGSN) 133, which directs communication to a transmitter 132 in communication with a cellular/wireless device 131. The communication of the application servers 122, 124 and 126 through the IMS core 110 on to the device 131 using SIP as a means for collecting data used in profiling the overall user experience is a novel method of presenting an IMS user experience for the user using the device 131, and is an exemplary embodiment of the present invention.

In this network architecture 100, IMS creates intelligence by utilizing Session Initiation Protocol (SIP) 101 for call set up, call maintenance and termination. IMS creates a unified signaling, authentication and call control system for any IP-driven network, be it cellular, Wi-Fi, wireline or other. During the initiation of a data (IP) session, several attributes are collected using SIP, including, for example, device type, device configuration and other intelligence as part of an Options and Feature tags within the protocol. This intelligence can be captured as part of the user session and collected at each Application Server (AS) 122, 124 and 126 in the network or in a separate data repository accessed by the Application Server. In this embodiment of the present invention, FIG. 1 represents the network architecture for an intelligent, SIP enabled service model. Either the mobile handset 131 or the AS 122, 124 or 126 is the endpoint of logic for this intelligent collection of user information. A subscriber database is generated through the intelligence available in the HSS 111 and the AS.

The AS will also collect data from the HSS 111 in order to complete a profile for each subscriber as usage for an application continues. Certain functional services can be applied to multiple applications utilizing this SIP enabled IP packet network. One such service can be the ability to detect whether other users are online, the access method for which they are online and whether they are available and by what means they are available (e.g., voice call, IM, etc.).

In this embodiment of the present invention, FIG. 1 serves as a systems diagram to use when considering the subsequent figures presented in this application. Among features shown in FIG. 1 that are considered in further detail are the IMS UE at the device 131 and the SIP based application servers 122, 124 and 126 specifically connected to the IMS core 110, which provide the basis for intelligent feedback utilizing feature tags in the SIP stack. It is shown that the IMS core 110 is in process with the signaling being deployed. The next steps are to define the Application Server environment 120, the requirements for the User Experience and corresponding User Interface at the device 131.

Figure 2:
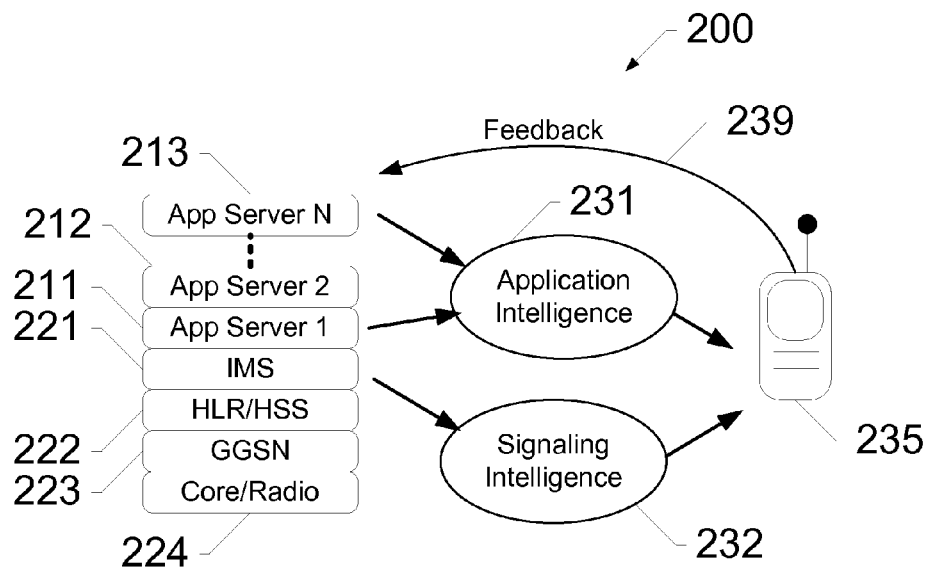
FIG. 2 shows a network—service architecture according to an exemplary embodiment of the present invention.

In considering the service layer of the network-service architecture 200 as shown in FIG. 2, signaling intelligence is used in developing user profiles that are stored at the application (server) layer 211, 212, 213 and used to enrich the experience. Applications are pushed to the subscriber's device 235 through communication, for example using SIP, and are controlled by IMS 221. Feedback 239 is given from the device 235 regarding various relevant information, including, for example, type of service, when used, duration, its capabilities, its profile, interaction with other services, etc. Intelligent attributes are embedded in the IP packets as a part of the standard SIP protocol. These attributes can be compiled with user specific information for profiling. Profiles are generated with subscribers who sign up for this service and are fully aware of the intelligence of the profile. When a subscriber signs up for the SBS, he will be pushed back content and applications which have been identified based on his profile of usage. Such application intelligence 231 is made possible through the feedback 239 from the device 235 to the application servers 211, 212, 213 and their interaction using IMS 221 and signaling intelligence 232. Home location register/home subscriber server (HLR/HSS) 222, GGSN 223 and Core/Radio 224 assist in the processing of the information received through the feedback loop 239 from device 235, and its subsequent push of application intelligence 231 back to the device 235.

Figure 3:
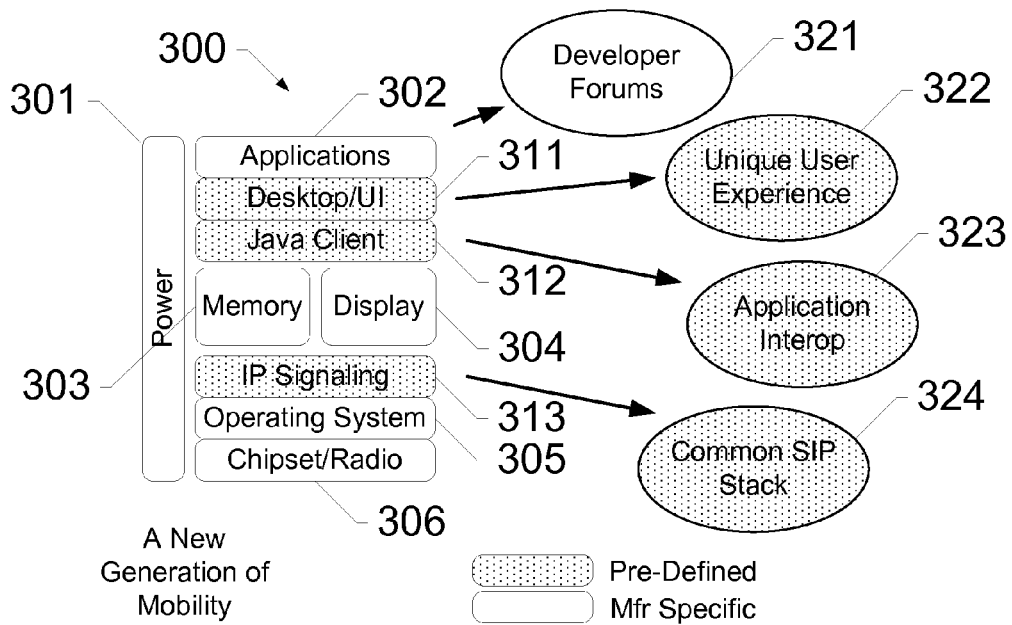
FIG. 3 shows device requirements according to an exemplary embodiment of the present invention.

On the device side, a number of elements can enhance the SIP usage experience. As shown in FIG. 3, a common framework 300 for devices is helpful in order to provide consistency and security across the network. Some of these elements include standard functions on a device, including power 301, applications 302, memory 303, display 304, operating system 305 and chipset/radio 306. Device manufacturers may be given specifications at developer forums 321 that define a common SIP stack 324, Java Client 312 (based on standards) and the unique User Interface 322 for SBS. The combination of these elements produces the Unique User Experience 322 and allows for application interoperability 323, which will be described in more detail below. Within FIG. 3, the darker shaded portions may be pre-defined and made standard across the industry, although allowing for manufacturer variability for the elements presented in the lighter shaded portions.

Figure 4:
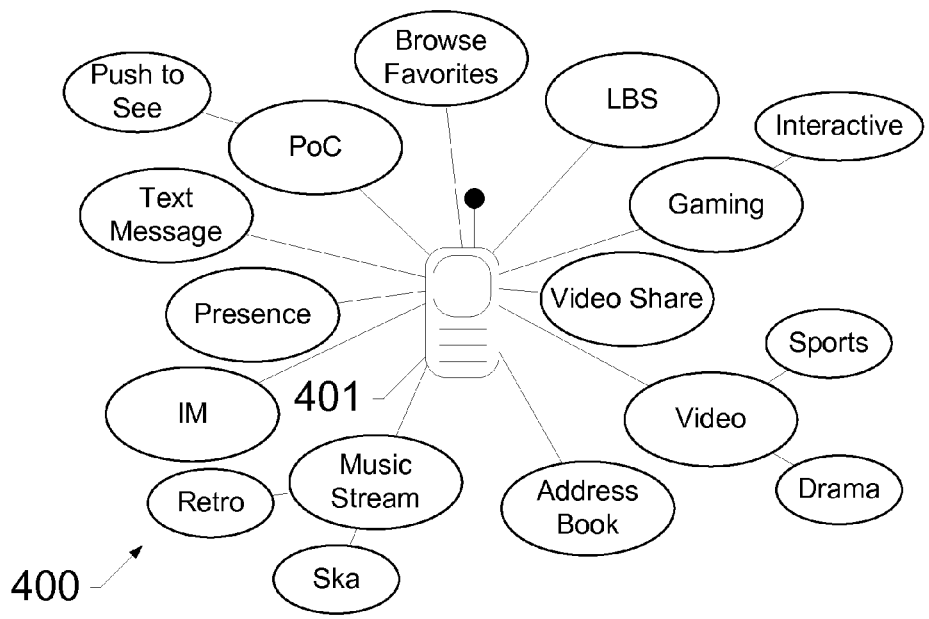
FIG. 4 shows a unique user experience (UUE) object oriented multi-application ability according to an exemplary embodiment of the present invention.

Some of the many unique features of the exemplary embodiments according to the present invention include the user interface and user experience. In the exemplary unique user experience derived from a context oriented multi-application approach 400 as shown in FIG. 4, many different types of applications can be displayed and utilized on any SIP enabled device or handset 401. These applications include, but are not limited to, text message, IM, address book and gaming, among many other exemplary features and applications shown in the figure. Many other features currently under development or made available for future devices 401 are also within the scope of the present invention and can be made to operate under the architecture presented herein. Thus, such in-development and future applications are also within the scope of the present invention as described herein and throughout this disclosure.

Figure 5:
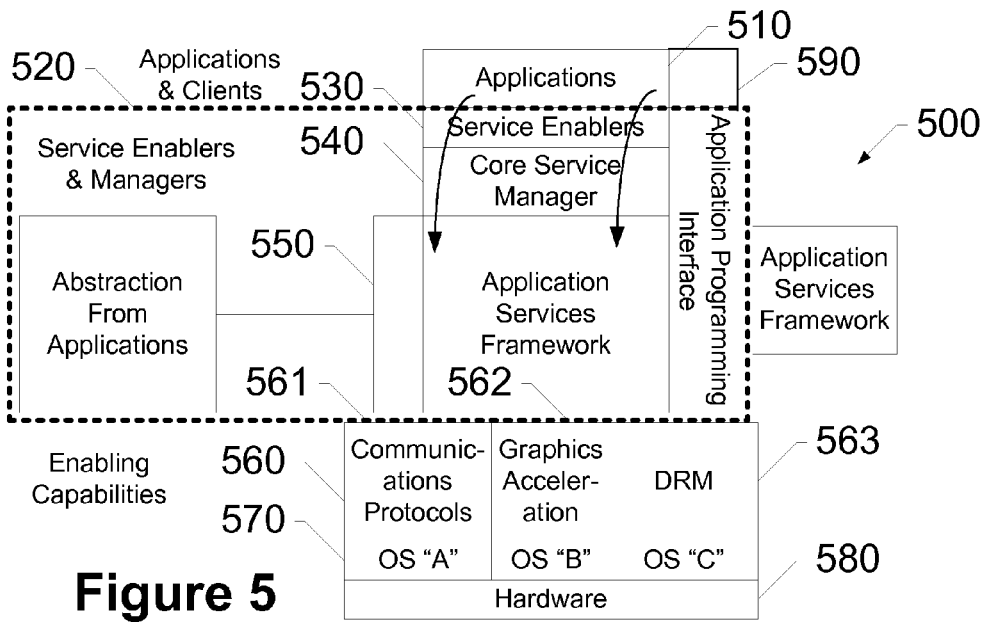
FIG. 5 shows a device platform, a standard SIP stack and generic client according to an exemplary embodiment of the present invention.

An architecture 500 of a device platform, standard SIP stack and generic client is shown in FIG. 5. A Core Service Manager 540 can be included on a handset to sort through the information provided by the AS and display the user profile at a peer layer to the application servers. Using an Object Oriented approach, the User Interface (UI) enables services to be launched on-the-fly and subsequent sharing of intelligence from application to application utilizing the intelligent feedback loop from Application Servers, the Core Services Manager 540 and a dynamic profile at the device. The device can "learn" based on previous sessions and create customized service delivery such as "last used" buddy list (e.g., the last five buddies contacted will roll up to the top position on the list). The intelligence given back to the device can create the Unique User Experience which is a customized User Interface for each and every subscriber on the network. The net result of this service model is the creation of individual profiles resulting in a match of services from the AS to the device for every subscriber. This is a novel departure from conventional service models and human interface to mobile devices. Subscribers only see what they want to see and use the mobile device as a personalized communications platform customized to their individual lifestyle, scenarios and context. This is partly why this experience is being termed the "Unique User Experience" throughout this disclosure because each user can have a different user experience depending on how the device is set up according to that user's desires and needs.

Now considering the device platform 500 shown in FIG. 5, a standard SIP stack and Application Services Framework enables consistency, interoperability and security of applications across multiple devices. FIG. 5 is a depiction of this environment. Providing Application Programming Interfaces (APIs) between the applications 510 themselves and the overall framework 520 produces an abstraction layer allowing software developers the ability to program once for many different devices. The overall framework 520 allows interaction between service enablers 530, the core service manager 540 and applications services framework 550 (which is also used to describe the elements 530-550). The same APIs that are between the applications 510 and the framework 520 are also between the lower layer code 560, 570 and 580 and the framework 520. The programmer need not be concerned with Operating System uniqueness but only with specific "calls" which are predefined in the service enablers and managers framework 520 itself. Such lower layer code 560 can include for example communications protocols 561, graphics acceleration 562 and DRM 563. Operating System (OS) lower code 570 can include a number of different operating systems. Lower code 580 includes various hardware. An overall application programming interface 590 allows for a substantially universal control over the various universally programmable components encompassed by layers 510-550. Such top level universal platform may be constructed over any lower level operating system, code or hardware, as shown in FIG. 5.

Figure 6:
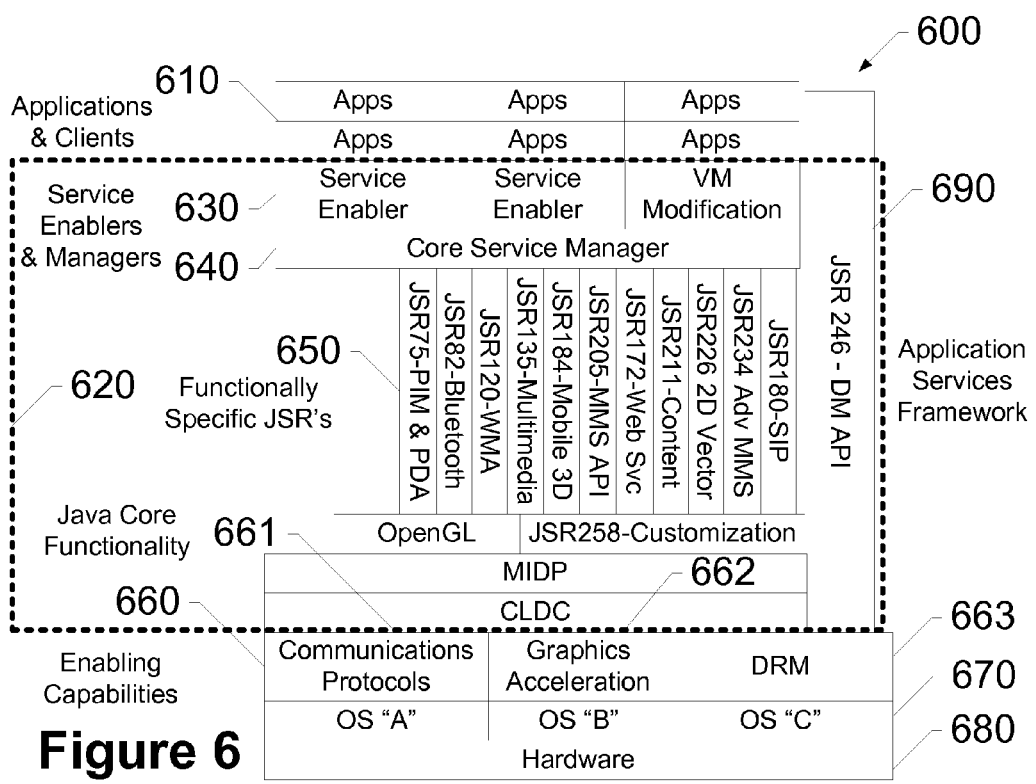
FIG. 6 shows a specific device platform, a standard SIP stack and Java client according to an exemplary embodiment of the present invention.

One specific, but non-limiting example of architecture 500 as depicted in FIG. 5, is presented as a Java framework 600 shown in FIG. 6. The numbers corresponding to various components presented in the specific example of Java framework 600 in FIG. 6 correspond to the similarly numbered components shown in the generic architecture 500 shown in FIG. 5. Although Java is presented as a specific example in FIG. 6, other approaches may be used to accomplish the same design intent. These include, but are not limited to, a Linux, C++ or Flash Implementation, among others. The unique design is created in the abstraction of the service enablers 630 from the hardware functional elements such as the communications protocols (SIP for instance) and hardware enablers 680 such as graphics accelerators 662. An important aspect of this UUE service is at the User Interface and how the user interacts with the device. The experience is based on the ability to quickly move from one application to another and dynamically change profiles as usage patterns are detected by the AS. This dynamic change in profile is achieved using feature tags in the SIP stack for intelligent processing of information. The resulting User Experience is one in which new bundles of applications are made available rapidly to the end user and are specific to his/her context. Efficiency in the multitasking and the customization of profiles are of the utmost importance. Software applications should be developed with as much optimization as possible and interfaced to the Java environments by calls to the lower level of code.

The exemplary software stack shown in FIG. 6 is unique in defining the connection between an applications service framework 620, which creates a service abstraction, from the OS 670. The Java implementation shown in this specific embodiment is exemplary and not limiting of the scope and capability of the present invention. There could be many other approaches that capture the same concept.

Figure 7:
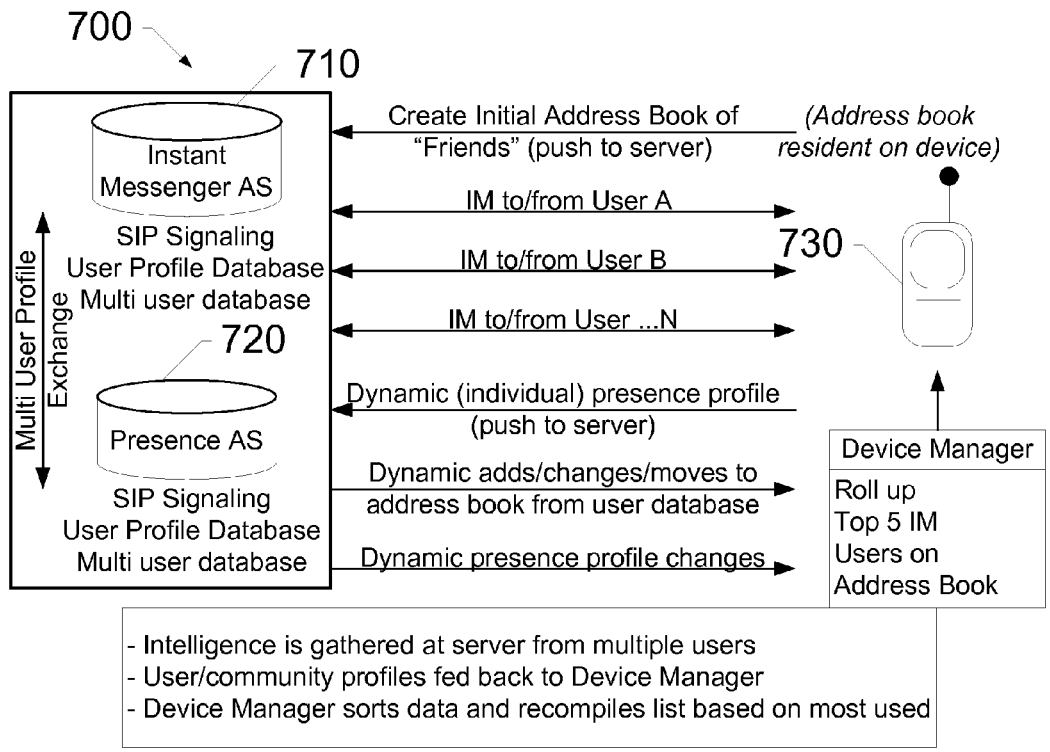
FIG. 7 shows a UUE data flow example according to an exemplary embodiment of the present invention.

A UUE data flow 700, as shown in FIG. 7, is an example of how each application can interface with the AS and the Core Service Manager (or Device Manager) to manage and display services to a device 730 that interrelate (such as Instant Messaging 710 and Presence 720). Interactive intelligence to and from the AS and the Device Manager allows each application to collect attributes such as "most used." This information is used by the Device Manager to create the User Interface for each application based on presence and availability.

Figure 8:
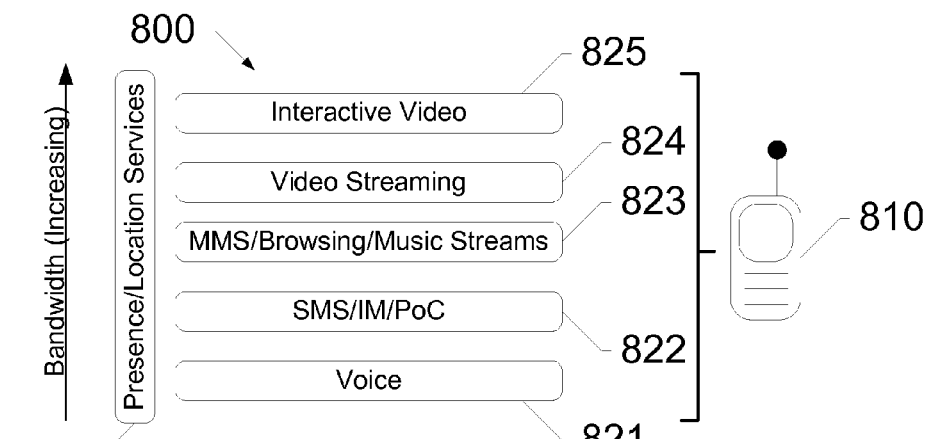
FIG. 8 shows a service "threshold" according to an exemplary embodiment of the present invention.

As shown in FIG. 8 as graphic 800, there are two generally constraining elements to the SBS service model, namely bandwidth and device capability (including processing power, memory, display real estate and power consumption). The network has some capacity to serve up multiple applications and the device 810 may have some limitation for the number and types of simultaneously launched applications as well. In order to attract more users, a service "threshold" can be established, as shown in FIG. 8, for applications which require less bandwidth and processing power, but are still a part of the new service enabling power of IMS and intelligent feedback. For example, as shown in FIG. 8, interactive video 825 requires more bandwidth than video streaming 824. The rest of the exemplary services 820 shown require less bandwidth in the order presented, namely, MMS/Music Streams 823, SMS/IM 822 and voice 821. Other services 820 are also possible but were not included in the figure for sake of simplicity. It should be noted that depending on the capability and bandwidth of the device 810, two or more interacting services 820 may be used simultaneously.

Setting service levels based on these thresholds will allow a larger population of users to be served as higher end networks (e.g., 3G) become more prolifically available. Lower service levels represent a higher number of subscribers, but at a much reduced bandwidth which will add to the available capacity of the network for the UUE.

Now that the various elements and functions of the exemplary embodiments according to the present invention were described, a number of non-limiting examples will be presented that show the capability and flexibility of the present invention in various real life scenarios. These scenarios are presented only for purpose of understanding some of the abilities of the present invention and are not intended to be the limitations and scope of the present invention. Many other uses, scenarios and capabilities are possible, and within the scope of one having ordinary skill in the art after consideration of the present disclosure.

In these examples, by deploying a Universal Mobile Telecommunications System (UMTS) network capable of handling high bandwidth Internet Protocol packet based applications in conjunction with the deployment of an Internet Protocol Multimedia System, a service model is developed unlike any in conventional use. As previously described, a UMTS network may not be required for this unique service offering, but is used in this description as an example of a high bandwidth mobile network. By determining the service model over this medium which offers a radically differentiated service and associated value proposition to users, a logical increase in user choice, satisfaction, retention and ability should result.

One of the purposes herein is to outline the characteristics of the services according to the present invention that will transform the methods in which service delivery is performed. IP Multimedia Systems (IMS) combined with Session Initiation Protocol (SIP) provide the interoperability and standardization required to develop the Scenario Based Services (SBS) model for users.

Thus, one of the many achievements of the present invention is to define and describe the new user experience and value proposition available using IP Multimedia System applications for services in the wireless network. There are a number of ways that this can be achieved, including, but not limited to:

customizable user interface on an ad-hoc basis; access to applications on a multi-nodal (multi-tasking) environment vs. multi-channel (uni-tasking) environment; increased individual profiling combined with customizable interfaces and multitasking equating to increase in Average Revenue Per Unit;

carriers differentiating their service offering from other operators substantially;

and return on investment more likely to be realized in a shorter time frame in a multi-service environment utilizing a common platform architecture (such as IMS).

EXAMPLE 1

Baseball

John is an avid Atlanta Braves (MLB) fan. He has a pair of tickets to a division play off game on a week night, with a 6:30 P.M. start time. The tickets are for corporate box seats and he and his friend Jack are excited about the opportunity. Several colleagues from work will be at the game as well. At 5:00 P.M. on the day of the game, Jack stops by his friend John's house in the north end of town and they start the trek toward the game at Turner field, downtown Atlanta.

Because of the usual heavy traffic on the Atlanta Interstate 85, the guys opt to get on the road quickly in an attempt to beat the traffic. As usual, a stalled car as well as the daily rush hour traffic has caused a huge back up on the only major freeway down to the game. They find themselves stuck in the traffic and it is now 7:00. The game has already started.

John, a frustrated passenger, remembers he brought his SBS enabled phone. He pulls the phone out to find out where everyone else is. Using tpLocator, he quickly sees that there are eight of the ten people from work at the game, which leaves only his friend George and he in traffic. tpLocator is an application based on the True Position location system within the network. This technology combined with the intelligence of SIP/IMS (presented on the phone as a "buddy list" of people) displays the active usage of an application such as PTT and depicts the exact location of other SBS users.

John sees (using, for example, Video iShare, a one-way video streaming application which allows a real-time look at an event from one subscriber to another over any 3G network that utilizes IMS/SIP) that his friend Frank is at the game and has his iPTT (Push to Talk over IP, this application is a packet based (IP) voice call, integrated into IMS for Multi-nodal service) service on. It is already the $3^{rd}$ inning and John is desperate to get an update. He dials Frank up using iPTT. Frank lets him know that Chipper Jones is on deck to bat. "Man, I wish I were there. Isn't Chipper on a record setting hitting streak?" John asks. "Yep, and he is only three at-bats away from a record." Frank reports. "Hey man, I'm gonna send you a Video iShare session, O.K.?"

Frank sends a message to John to start up a streaming video of the game. "Can you see him, John?" "No, zoom in on him!" Frank uses his digital zoom and frames the batter up on the screen. "That's better. Hey, did you run into this traffic?" John asks. "No, we left early and missed it. Hold on a minute John, George is calling me . . . I'll patch you in using 3-way iPTT" (this is a feature of the IP based PTT which allows a 3-way call, set up from a Multipoint Control Unit (MCU) on the iPTT applications server). They are now in a conference call. "Hey George, I've got John on the line." "George. Looks like you're down 85 further than I am." John says. "I got off at $17^{th}$ street and I'm taking the side streets down. I should be there in just a few minutes. John, why don't you take 17$^{th}$?" George asks. "I get lost down here too easily and my buddy is geographically challenged as well", John responds.

"Turn your SBS Navigator on you idiot! (By tying together information about both subscribers using tpLocator, a path can be charted by tracking the first subscriber, mapping his signal from one position to another and then relaying that information in the form of a map (the "follow me" feature is an overlay of the generated path onto the Georgia-Navigator public domain application). This is an add-on application to the tpLocator application server.) You can just follow my path down." John switches on his Navigator and gets the path George is going with the Follow Me feature. He sets the icon on GEORGE and the map begins to highlight the path George has taken from 17$^{th}$ street. "That's good, man. But I'm still about 5 miles from 17$^{th}$!" "Not my problem John. I'll leave my Navigator on until I get to the stadium so you can keep following me" George adds and then hangs up. John asks, "You still there Frank?" "Yep". Just then, someone yells from the food bar, "Hey Frank, is that John?" Frank swings his I-Share camera around to reveal Sam stuffing his face with hors d'oeuvres. "Hey John. You should be here. The food is great!" "Get him off of there!" John responds. "O.K. John, I'm going to let you go. See you when you get here."

John hangs up with Frank but keeps his Navigator going to follow George's path. The screen has now zoomed onto the street level to show John where to make left and right hand turns. A Voice Activated Helper (VAH) speaks out the commands for the turns. John remembers he has a favorites URL set on the Braves so he opens up another session to see what Chipper Jones' stats are. Up pops a MLB Portable Pro Card site (up to date information can be displayed on any MLB player with his most recent statistics including current play and video highlights of the player's season) for SBS customers revealing Chipper's stats along with an article from the local newspaper on his quest for the hitting record. He turns up a new session with his SBS ESPN Link and launches a highlights clip of the last Braves game.

"Hey John!", Jack sounds perturbed. "Hey! I'm trying to watch this highlight. Do you mind?" "Yeah I do. I need you to see if I should stay on the 85 until 17$^{th}$ or get off. I can't see ahead with these trucks in my way!" "Hold on a second" John says as he opens up an SBS Georgia-Navigator web site (because of the multi-nodal capability of the IMS enabled handset, a subscriber is able to pull up any WAP available information on the Internet; this can be done without having to shut down other applications to receive the information) and works his way to the web cam just an exit down from where they are. "Just stay here Jack. The traffic is moving just ahead. We can get to 17$^{th}$ quicker if you just stay on through the next exit."

Jack takes the 17$^{th}$ street exit and follows the rest of the directions from John's Navigator to the stadium. As they approach the game, John shuts down his SBS services and launches his WiFi radio which is communicating with the Braves Closed Circuit TV system. He pulls up the stream and begins to watch the game as he and Jack walk from the parking lot. In just a few minutes, they are in the box and enjoying the game live.

EXAMPLE 2

It's all about the Opera

Bob has tickets to the opera with his wife Sally. He is in a rush to get out of the office as their tickets are the matinee showing and he still needs to get home to get into the right attire. He dropped his suit off at the dry cleaners earlier that morning. Bob pulls his SBS phone out to check the status of his "rush" dry cleaning by using the Dry Cleaning icon under his Personal Services menu. (The Personal Services menu is an iconic list of everyday items that show the subscriber the status of his service. Local business set a flag for their customers using this service which carry the following status buttons: Complete, Call, Picked-Up. Services including Car Dealer Service/Repair, Dry Cleaning and Day Care, etc. are signed up.) He also checks to see if his kids have already been picked up under the same menu. The status is green on both Dry Cleaning and Day Care so he heads out of the office to start his evening.

Bob checks to see where his wife is using his tpLocator (the presence module can also be configured to interact with tpLocator to give location as well as status (busy, in a meeting, etc.)) and notices that she is still at work, and is in a meeting. After cradling his phone in the car, he makes a quick Voice Activated IM Call to his wife who is also trying to get out of the office. (Bob and Sally use SIMPLE IM which allows them to check presence and converse over their SBS enabled phones; this unique service takes audible commands and places them into short Instant Messages for a hands-free experience; it will also read back (audibly) messages received when in Speaker Phone mode). He lets her know that he has left the office and is on his way home. Sally responds with a quick IM to let him know she is running about 15 minutes late and he needs to pick up a pizza for the kids.

Bob uses his hands free to call up the local pizza shop so the kids will have something for dinner. Before he reaches home he checks the status of the pizza and sees that it is ready for pick up. He swings by, grabs the pizza to go and arrives home just as Sally is pulling up. They quickly head off to the opera and arrive just before the opening act.

To be honest, Bob is not really an opera fan. His boredom reaches a skin crawling level before the end of the first act. Unbeknownst to his wife, he has his SBS Play-N-Go service enabled with the game DOOM. (The Play-N-Go is a service that allows gamers access to multi parties no matter where they are within the UMTS network for fast action, high intensity games. The service is a part of the SBS model which includes a common Presence interface.) As a back up plan to watching the play, he has set up a multi-party game in advance for the third act of Verdi's Aida which is set to begin right after intermission in 15 minutes. He wants to play the game with 6 participants. His preference is to play with known players, but will take others outside his known sphere. However, Bob only wants to play with other participants who are "experienced" gamers. Bob contacts his 'buddy list' of DOOM players seeing who is available to play. During intermission, he talked to Bill, a co-worker who is sitting in the Mezzanine section and expressed an interest in joining the game. Bob goes to his address book to send him a message inviting him to join the game.

Bob receives confirmation to join the game from only 2 people on his buddy list. He does receive confirmation from 3 other "experienced" players willing to join the game in 15 minutes (during this interval, 3 other "experienced" players indicated their desire to participate). Although Bob is setting the game up as a 6 player game, he is willing to expand the number of players if people from his 'buddy list' come on-line. Alternatively, if one of his "buddies" comes on-line prior to the start of the game, they are offered the option to pre-empt one of the non-buddy list participation. These features are all a part of the Play-N-Go gamers service option on the SBS system. Because DOOM is a "lock 'n load" category of game, it requires all participants to be connected to high bandwidth access (e.g., UMTS).

Sally catches Bob in the middle of a DOOM challenge and she is beside herself with anger. Seeing her "look", which only a wife and mother knows how to give, he quickly shuts the game down. Being a quick thinker, he opens his phone back up and brings up his Personal Services list, text messages an order of flowers and sets the "Status-reply-deliver" trigger. (With trusted vendors/service companies who provide delivery, a preset can be made in The Personal Services set up for home delivery of products.) After the play, Sally is still steaming, but Bob knows he has at least one line of defense when he checks to see the Complete icon is green for the flower delivery.

Bob and Sally return home to find a fresh bouquet of flowers on the doorstep with postcard attached. It is a picture of their last vacation together. Bob had the foresight to deliver a Quick Picture from his phone memory and attach it to the flower delivery (a service offering that allows post card pictures to be sent from pre-shot phone camera images can be deployed with other services offered as a portion of SBS, utilizing SIP). Sally picks up the flowers and gives Bob a ghoulish grin, "Nice try buddy. You're still sleeping on the couch tonight!"

Scenario 3—Meeting Day

Gary has just completed a call with a major supplier of products for his company. The supplier has a new technology that will allow Gary's business to gain a significant increase in productivity and provide some needed cost reduction. The investment in this product will be substantial and Gary wants to drive consensus among all divisions of the company for approval. There are offices on both coasts of the U.S. as well as several field offices across the country. Corporate Head Quarters is in New York City.

There are currently high speed land line (Internet) connections between two of the coastal offices, but nothing in the field. The supplier is located in Korea, but wants to meet face to face in the corporate offices. The product is visual in nature and needs to be "shown" to the entire audience of divisions involved in the decision making process. A webinar was suggested for the presentation, but several of the key people will be in transit on business trips and the decision cannot wait as the fiscal year for funding is rapidly coming to a close.

The day of the presentation is at hand and the supplier is ushered into a large conference room at the corporate head quarters. The audience of participants, stretched across several time zones turn on their SBS iMobile Conferencing system (the iMobile Conferencing system utilizes a base platform of features and functions from the IMS; a 3G network is required for a variety of these applications because of the high bandwidth demand). Each participant is tied via the Presence Engine into the meeting invite from Microsoft Outlook® (Session Initiation Protocol along with APIs available from Microsoft allows convergence of these two applications to create a new service environment for mobile users utilizing the common IMS services platform). This allows the moderator to take a quick roll call and know exactly who is in attendance. It also indicates which of the participants are mVideo Conferencing enabled and White Board iShare enabled (Conferencing tools available in the iMobile Conferencing system include mVideo Conferencing, the ability to perform H.264 encoded interactive video and White Board iShare, a markup and database tool used for collaboration).

Once the administration of participants is completed, the supplier launches mVideo as the moderator from a local PC. The live meeting is "broadcast" (one of the network elements in this service is a Multipoint Control Unit which mixes the Audio/Video signal for each participant; a multi-unicast approach is used for each discreet stream) over the SBS network. Each mobile participant sees the moderator and can choose up to 3 additional participants to show on the active mobile screen from his address list. Next the moderator launches the White Board iShare application and begins to display a map of the territories under consideration for deployment of the product.

The moderator then displays a streaming demonstration of the product which takes over the full screen of each participant. The moderator asks if there are any questions after going through the demonstration. Several questions are fielded using an interactive tool, iShow (this is a part of the White Board iShare application; using IMS, the system will determine which of the participants has adequate bandwidth for the manipulation of the video stream and allow the tool to be used accordingly; the Moderator has control of each participant's use of tools), which allows any participant to scroll back and forth into the demonstration video and stop at various still picture locations.

After the stored demonstration is completed, the moderator opens up a Video iShare (this can be used in conjunction with the mVideo service simply by opening up another application; in this case, the service is used to one-way stream a live demonstration back to all participants utilizing the iShare application server capable of one-to-many streams) session where the actual product is in use at a current customer of the supplier. A brief demonstration is given in a live environment and subsequent questions fielded over the interactive mVideo Conferencing service.

Once the demonstration is completed, a map of each territory is redisplayed and the supplier asks for input regarding operating units in each location with applicable head count. The territory managers input the data live and a corresponding map is drawn in each region with the associated number of units required to outfit the company utilizing tpLocator (this is capable of overlaying in real-time any information driven by a device in the affected territory; in this case, the tool is used for manual input of data, but resides within a region and is made available to a secondary database (via a Customer Relationship Management—CRM tool) for purposes of calculating product demand in real time) and a link to the supplier's CRM tool. Consistent with the data input, a pricing model is initiated and the total cost of the product less discount is displayed to all participants. The total cost is about twice what Gary is willing to pay. He asks each of the territory managers to re-input their head count based on the minimum employee number needed to make the product work. The numbers are recalculated with a new price point automatically and with the discount, it is within budget.

The parties agree on a trial launch with subsequent meetings to discuss progress and get live feedback before all regions are deployed.

Scenario 4—The Family Vacation

Tom is looking forward to a well deserved time off with his family. The family wants to see relatives out of state in Florida, visit Disney World and then jump on a cruise ship for their family vacation this year. Having never been on a cruise, Tom opts to research the idea through the Automobile Club where he is a member. (As a part of the national Business SBS program, there are partnerships with major businesses in the community of travel and resorts; the American Automobile Association (AAA) and Disney Cruise Lines are two such business affiliates; by offering the Personal Services to customers of these business partners, a higher level of customer relationship and associated value is achieved). Tom sends a text message via his SBS registered phone to the local AAA store asking for information about his upcoming trip. He is immediately assigned a personal agent and a new address is added to the presence list in his phone under "Business Contacts" (a part of the Personal Services menu). The Automobile club has integrated an Intelligent IP-PBX from SBC Data Commerce Solutions group and associated CRM tool which is bed to the SBS Personal Services IMS core. This allows each customer associated with the service to be automatically updated in the presence listing within IMS. Also, every time the customer's DID is present on the AAA IP-PBX, all current information regarding the status of the customer is displayed (Name, last called date, purpose of call, event of discussion, alerts, etc).

The AAA agent checks status for Tom (using presence) at 3:00 p.m. that day and notes he is "unavailable". The agent sends an IM (using SIMPLE, an IMS standard Instant Messaging application, the messaging is tied together with other SIP enabled applications such as presence) to Tom to see when he would like to discuss the upcoming trip. Tom sends an IM back that he will be available at 6:00 p.m. After checking status on Tom at 6:00 the agent now sees that he is "available" and completes a voice call to him. They converse about the details of the trip and the agent takes down all of the pertinent information. Tom mentions they are interested in all things Disney for the kids and wants travel information including a "TripTIK" (mapping of all locations on the trip—AAA has the ability to digitally format the information and send it back to Tom's phone). Tom indicates he will be leaving from his home town Chicago, stopping in Jacksonville, Fla. to visit family and then going on to Orlando.

All of the information is added to the AAA database and a commitment to send additional information to Tom in the next couple of days. Additionally, the AAA agent obtains permission from Tom to populate his Personal Services menu with Disney related topics and information. Tom creates a special folder in Personal Services entitled Vacation and gives the (SIP) address to the agent. Because AAA has a preferred status agent listing with Disney, all associated travel information is available as well as a special content package for mobile video. Consequently, the agent sets up three areas of interest for Tom; Amusement Park, Cruise, and Merchandise.

Disney Cruise Line has developed content specifically for families regarding their many shore excursion adventures. The AAA agent pushes Tom this information via a link set up in the Personal Services newly created directory Vacation. Five separate icons are added with a short video clip describing each excursion. A simple selection is displayed next to each icon; Book, Delete, Questions. All of this information is pushed to Tom's SIP enabled laptop and his SIP enabled SBS phone (SIP allows multiple devices to be communicated to as long as the SIP address is consistent across each device. In this case, a laptop (using a UMTS PC Card) and SBS phone are both enabled with the same SIP address; his allows the information to be accessed with either a static (land line) connection or through a mobile device). This allows him to see the information from anywhere. While Tom is on a business trip, his 9 year old daughter calls with excitement about one of the excursions after she has previewed the video clip on his laptop. Tom pulls up the same clip on his mobile and they agree to book it (Advertising content is synchronized across multiple SIP devices as long as the SIP address can be validated as the same). He selects the Book cruise shore excursions button and receives confirmation with a green status. In the background, the excursion is added to the AAA database and transferred to Disney Cruise Line for billing.

The day of departure arrives and all of the pertinent information for the vacation including confirmation for a package deal to Disney World, Cruise details and embarkation instructions has been sent to the SIP address set up by Tom. The family packs into the family van and they head south. Tom opens up the eTripTIK, a service of Navigator (by utilizing the vast database of GIS from AAA, an overlay has been developed for mapping directions and providing real-time updates for travelers in order to avoid high traffic times and avert slow downs from traffic accidents; his is an adapted service from the tpLocator application server) on his SBS phone and is given ongoing directions to Jacksonville.

A hundred miles south of Atlanta, Tom unexpectedly runs over a tire retread and it lodges up in the engine compartment, bringing the van to a screeching halt. After moving the car to the side of the road, Tom launches his Emergency Finder (an application developed for AAA in emergency situations for customers who subscribe to the service; an alarm is sent via the tpLocator application server to a dispatch desk manned by a AAA service technician; the technician is displayed all pertinent information about the subscriber, including type of car, location of signal overlaid onto a map of the area and in this case, the eTripTIK issued through AAA; he then immediately responds to the signal and is in contact with the subscriber) from the SBS phone; the technician sees that Tom is Video iShare enabled (by using SIP application ID) asks Tom to show him the problem using Video iShare (a one-way video streaming application which allows a real-time look at an event from one subscriber to another over any 3G network that utilizes IMS/SIP). Tom describes the damage and the video is recorded and sent to the Claims department at AAA. The technician then sends a pick up order through the towing dispatch and arranges a rental car for the remainder of their trip. The rental car location and AAA certified mechanic location is available to Tom's phone when required (after the vacation, he will need directions back to this unfamiliar location to return the rental car and pick up the van—this is all accomplished through the tpLocator service).

After their upsetting experience, the family takes a while to settle back down as they get back on the road. Tom remembers that there are links to music videos and a full length Disney videos in his Personal Services Vacation folder. In an effort to calm the kids down, he asks his wife to open the laptop and connect via the network.

A menu of music and videos are displayed for the kids to choose through. Tom's daughter Jennifer sees that the video "Cinderella" is available and she clicks the play button. Since Disney Merchandise has been added to Tom's Personal Services, the billing has already been set up in advance and the content is streamed to the appropriate SIP enabled device from the application server.

The same service is available on Tom's phone and his son Tommy (age 13) is not interested in a cartoon feature. However, he does have a crush on Hillary Duff and Kaci Brown (both Disney music artists). Tommy takes his Dad's phone and quickly downloads 4 music videos while his sister is watching her movie. In the middle of the music video "Unbelievable" by Kaci Brown, the phone rings, Tommy pauses the video and answers. "Hey Mom, it's Grandma." Tom's wife, Jan, takes the phone and let's her parents know they are going to be late because of the car accident. Her parents immediately begin to panic and ask probing questions about the incident. Jan pulls up the Video iShare Tom shot of the car for AAA and streams the video to her parents (Video iShare has the capability of storing the streamed image on the phone for later use. It can be then streamed as a "store and forward" video). They are relieved that the car looked relatively intact.

She disconnects and hands the phone back to Tommy where he continues his viewing of the music videos where he left off.

The original plan was to visit with Grandparents early in the morning, get to Disney World and still have enough time that day to get on the ship in the late afternoon. With the accident burning up so much time, the family only has time for a quick stop at the Grandparents and then on to the ship. Jan sends an IM to their AAA agent to let him know that they are not going to make Disney World because of the accident. Their agent automatically credits their account and sends a confirmation number for the cancellation which is stored in the Vacation folder.

Tom keeps status on the cruise ship boarding with his SBS phone. Disney Cruise Lines streams the status to all passengers who are boarding and has a map of the ship with each cabin located for every customer. Disney has outfitted their check in system to be integrated with the Personal Services feature for customer who have subscribed. This service is modeled after the seat charting that has been done on major airlines for years. Cruise personnel as well as passengers can check status on which cabins have checked in and which have been occupied by a color coding displayed on the screen.

After a few more uneventful hours on the road, the family pulls up to the port where they park. Tom knows they don't have much time to get on the ship as most of the cabins have already checked in. The gate agent for Disney Cruises sees that Tom has booked through the AAA system and asks if he has Bluetooth on his SBS phone. He affirms that he does and she asks him to allow her access to his Personal Services folder where she downloads the pertinent family information prior to boarding including Immigration forms (Private information can be stored on the Personal Services application server and downloaded through secure access to personal devices; in this case, passport and immigration information was given to the Travel agent and stored for later retrieval if necessary; access can be gained to the information via a local wireless connection if the owning party gives permission to do so). The transfer is done seamlessly in just a few seconds.

Now on the ship and enjoying a view of the harbor, Jan calls her parents and streams one last Video iShare of their ship and the ocean to her parents to let them know they have arrived safely. Tom has a sigh of relief and says to Jan, "Sure glad we signed up with SBS".

As may be gleaned from the above described examples of the use of the present invention, one of the many benefits of the present invention is the introduction of intelligence at multiple layers (lone application, application-to-application, Device/application to Server, Server/Application to Device/application, etc.). This is one of many unique features of the exemplary embodiments of the present invention. Without the use of the active intelligence aspect of the present invention, a user would be limited to a potentially non-intelligent environment, which is also novel, but does not embody the full value of the Unique User Experience, as defined above. Using a threshold definition for UUE and intelligence as uses herein is also helpful because it will allow operators to take full advantage of the intelligence without having to saturate the network with bandwidth.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for communication in an IP Multimedia System (IMS), the device comprising:
    a memory including a plurality of interactive applications pushed from the IMS based on a profile of usage, wherein each application uses a common language to interact with each other application, collects a plurality of attributes including presence and availability, and creates a user interface based on the plurality of attributes;
    a power in communication with the memory;
    a display in communication with the memory; and
    a radio chipset in communication with the memory;
    wherein a plurality of feedback is given from each application on the device to the IMS regarding a time used, a duration of time, a plurality of capabilities, a profile, and an interaction with another application.

2. The device of claim 1, wherein each application interacts with a mobile unit having the same application.

3. The device of claim 1, wherein the plurality of feedback defines and controls a future use of each application.

4. The device of claim 1, wherein an application server activates functions in the plurality of interactive applications which is most useful for a user depending on the plurality of feedback.

5. The device of claim 1, wherein the plurality of interactive applications can be configured to have a user interface as desired by a user.

6. The device of claim 1, wherein a first intelligence associated with the interactive applications communicates with a second intelligence on a remote application server.

7. The device of claim 6, wherein the interaction of the first intelligence and the second intelligence provides a user an interface that is reflective of past uses of the user with respect to each application.

8. The device of claim 6, wherein the communication occurs using Session Initiation Protocol.

9. A method for communication between an IP Multimedia System (IMS) and a mobile device, the method comprising:
    sending the mobile device a plurality of interactive applications pushed from the IMS based on a profile of usage, wherein each application uses a common language to interact with each other application, collects a plurality of attributes including presence and availability, and creates a user interface based on the plurality of attributes; and
    receiving a plurality of feedback from the mobile device regarding each application, a time used, a duration of time, a plurality of capabilities, a profile, and an interaction with another application;

wherein the plurality of feedback is received from each application on the mobile device.

10. The method of claim 9, wherein the mobile device interacts by use of a collected intelligence through the plurality of applications with another mobile device having a substantially similar application.

11. The method of claim 9, wherein the plurality of feedback defines and controls a future use of each application.

12. The method of claim 9, wherein the mobile device interacts with an application server to activate a function of one of the plurality of applications most useful for a user depending on the plurality of feedback.

13. The method of claim 9, wherein the plurality of applications will be enabled at differing thresholds of service constrained by either network or device capability.

14. The method of claim 9, wherein communication between the mobile device and remote application servers occurs using a Session Initiation Protocol.

\* \* \* \* \*